United States Patent
Menz

(10) Patent No.: US 9,477,203 B2
(45) Date of Patent: Oct. 25, 2016

(54) MULTI-LAYER BODY, METHOD FOR PRODUCING IT, AND PRODUCTION OF FORGERY-PROOF DOCUMENTS USING SAID MULTI-LAYER BODY

(75) Inventor: Irina Menz, Grasbrunn (DE)

(73) Assignee: HOLOGRAM INDUSTRIES RESEARCH GMBH, Pliening-Ottersberg (DE)

( * ) Notice: Subject to any disclaimer, the term of this patent is extended or adjusted under 35 U.S.C. 154(b) by 213 days.

(21) Appl. No.: 14/119,884

(22) PCT Filed: May 31, 2012

(86) PCT No.: PCT/EP2012/060233
§ 371 (c)(1),
(2), (4) Date: Nov. 25, 2013

(87) PCT Pub. No.: WO2012/164011
PCT Pub. Date: Dec. 6, 2012

(65) Prior Publication Data
US 2014/0111837 A1 Apr. 24, 2014

(30) Foreign Application Priority Data
May 31, 2011 (DE) .......................... 10 2011 050 746

(51) Int. Cl.
*G03H 1/00* (2006.01)
*B32B 27/36* (2006.01)
*B32B 37/12* (2006.01)
*B44C 1/16* (2006.01)
(Continued)

(52) U.S. Cl.
CPC .............. *G03H 1/0011* (2013.01); *B32B 7/14* (2013.01); *B32B 27/32* (2013.01); *B32B 27/36* (2013.01); *B32B 27/365* (2013.01); *B32B 37/12* (2013.01); *B42D 25/328* (2014.10); *B42D 25/43* (2014.10); *B44C 1/16* (2013.01); *B32B 2307/40* (2013.01); *B32B 2307/748* (2013.01); *B32B 2310/0831* (2013.01); *B32B 2425/00* (2013.01); *B42D 25/47* (2014.10); *B42D 2033/10* (2013.01); *B42D 2033/30* (2013.01); *B42D 2035/06* (2013.01); *B42D 2035/30* (2013.01)

(58) Field of Classification Search
CPC ............. G03H 1/0011; G03H 1/0027; G03H 1/0244; G03H 1/0252; G03H 1/0526; B42D 15/105; B42D 2035/22; G06K 19/16
See application file for complete search history.

(56) References Cited

U.S. PATENT DOCUMENTS

2009/0176032 A1* 7/2009 Kritchman .............. C23C 26/00
427/508
2010/0206953 A1* 8/2010 O'Boyle ................... B32B 7/12
235/492

*Primary Examiner* — Jennifer L. Doak
(74) *Attorney, Agent, or Firm* — Mark M. Friedman

(57) ABSTRACT

A multi-layer body includes a carrier film, a release layer, an embossed hologram layer, and a vapor-plated reflection layer. An adhesive layer is UV activated and includes a partially activated zone. Cured adhesive regions connect a transparent polycarbonate film and parts of the embossed hologram layer to one another inseparably. The cured adhesive regions are arranged about the periphery of an uncured adhesive region of the adhesive layer to form a frame around the uncured adhesive region. A forgery-proof document is produced using the multi-layer body. Uncured adhesive regions of the multi-layer body are partially cured with UV light through an information-carrying optical mask. The carrier film is removed together with the release layer and non-bonded embossed hologram layer regions. An upper protective film is applied to individualized embossed hologram layers and is hot pressed together with additional films.

10 Claims, 4 Drawing Sheets

(51) Int. Cl.
  *B32B 7/14* (2006.01)
  *B32B 27/32* (2006.01)
  *B42D 25/43* (2014.01)
  *B42D 25/328* (2014.01)
  *B42D 25/47* (2014.01)

MULTI-LAYER BODY, METHOD FOR PRODUCING IT, AND PRODUCTION OF FORGERY-PROOF DOCUMENTS USING SAID MULTI-LAYER BODY

The invention relates to a multi-layer body according to the preamble of Claim 1, a method for manufacturing it according to the preamble of Claim 5 and manufacture of forgery-proof documents using said multi-layer body according to the preamble of Claim 7.

Holographic hot stamping film applications on credit cards and personal documents have long proved their worth in increasing the protection against forgery and copying. Normally, these hot stamping films consist of a carrier film, a release layer, a thermoplast layer into which relief structures are stamped, a reflecting layer and an adhesive layer which can be activated by heat. The manufacture of the holographic structures of the hot stamping film takes place by means of a holographic stamping matrix, using replicative stamping into the thermoplast layer. In this manner, a hot stamping film with repeating holographic motifs, called standard motifs, is obtained.

In the application process, only the film parts corresponding to the contour of the hot stamp are transferred on a substrate with a heat-activated adhesive by means of the hot stamp. The other film parts remain on the carrier film and are drawn off the substrate together with the latter. For instance, the hot stamping film can also be applied on the entire surface of a credit card if the hot stamp has the shape of a credit card (DE 100 13 410 A1). These hologram film bodies cannot be used for the provision of multi-layer bodies which are only individualized with the use (transfer) of the passport photograph.

For improving the protection against fraud of personal documents, it is increasingly required to have individual personal data also in the applied holographic optical elements which can be compared visually with the printed personal data during verification of the authenticity of the document. It is known to use volume hologram film overlays with holographic passport photographs for document protection (EP 0 896 260 A2). The manufacture and material costs for volume holograms, however, are many times higher than those of hot stamping films with holographic relief structures.

The manufacture of individual information of holographic relief structures stamped in a film requires additional steps. EP 0 420 261 B1 shows different methods for this purpose. Individual modifications of the hot stamping film structure can be performed, such as printing individual data on the reflecting layer with subsequent adhesive coating, demetallization or alteration of the reflecting properties of individual portions of the reflecting layer, individual laser engraving of the stamped thermolacquer layer or partial adhesive coating in the form of individual data. These additional steps substantially increase the production effort, and the hologram film carrying personal data requires additional safety efforts in intermediate storage till application on the document takes place. Also, aging of the material and mechanical damages, particularly in the area of the adhesive layer applied in the form of individual personal data, can substantially impair subsequent application quality.

It is also known that diffractive hot stamping film can be applied partially on substrates if only specific substrate portions have been previously coated with adhesive to be activated by heat (DE 35 11 146 A1). The hot stamping film itself has no adhesive layer, and application only takes place where adhesive is located on the substrate. If, for instance, an adhesive is applied on a document of title in the form of a strip, a strip from a hot stamping film can be applied on the document (DE 102 22 433 A1). For adhesives, printing inks can also be used which become sticky at higher temperatures. This opens up possibilities for an individual film application without the necessity of lengthy retrofittings of embossing dies. Thus, writings with different types of information, numbering etc. can be applied quickly and inexpensively on substrate surfaces from the hot stamping film. However, highly complex motifs, such as passport photographs, cannot be directly applied individually on the document from diffractive hot stamping film with this method.

From WO 2009/103274 A1 (DE 10 2008 009 699 A1), a method for individualized hot adhesive application is known in which i. a. a passport photograph is printed in inverted form on a personal document (substrate), with the printing medium (toner, dye) developing adhesive properties at the laminating temperature. Then a holographic hot stamping film is laminated on top of that; its top carrier layer and the decorative film parts not thermofixed are then removed, whereas in the printed passport photograph areas, the decorative layer remains on the substrate as a coherent layer. Then any remaining film residues are removed by an rolled over adhering film, and finally a protective layer is laminated on top. With this method, it is not possible to separate the activities of providing a holographic multi-layer body by the manufacturers of hot stamping films on one hand and the (subsequently) individualizing transfer with e.g. holographic passport photographs of the decorative layer by the user and producer of documents or identity cards, respectively, on the other.

Finally, from WO 2007/048 563 A1, a multi-layer body is known which consists of a holographic hot stamping film (carrier film, release layer, decorative layer), an adhesive layer which can be activated by heat or UV rays and a paper release film. During use (transfer), a heated stamp is pressed onto the film stack or in a certain portion UV irradiation is performed, with the adhesive being activated only in this portion. During subsequent removal of the release film, the decorative layer in the contour of the heated or irradiated portion is separated from the carrier film of the hot stamping film and remains on the release film. Now the hot stamping film altered in this manner is hot-laminated onto the document, after which the top carrier film is drawn off and optionally a protective film is applied. Thus, the release film can be removed directly before application of the hot stamping film on the document, preventing damage of the film surface during intermediate storage. With this method, however, very fine contours such as in passport photographs cannot be applied on the document since, as is well-known, the removal of the film leads to the formation of film dust which can settle on the adhesive to be activated thermally, thus impairing subsequent bonding with the document surface. Also, this film transfer is quite tedious since two films are to be removed.

It is therefore the object of the invention to disclose a generic multi-layer body, a method for manufacturing the same and for the manufacture of a forgery-proof document with holographic passport photograph, which are easy, safe and cost-effective to manufacture and to handle and by means of which the manufacture and the application of a holographic hot stamping film can be separated spatially and temporally and no particular safety effort in intermediate storage because of individual personal data is required.

This object is achieved by a multi-layer body with the characteristics of Claim 1, a method for manufacturing the same according to Claim 5 and a manufacture method for forgery-proof documents with the characteristics of Claim 6. Advantageous embodiments are indicated in the dependent claims, referring back to the independent claims.

According to the invention, the lower layer of the multi-layer body is a transparent polycarbonate film which preferably has a thickness of 50-100 μm, whereas the cured UV adhesive area is arranged at the periphery of the uncured UV adhesive area of the at least one adhesive layer portion on top of the polycarbonate film and surrounds it like a frame. This allows an optimum subsequent individualization by mask light exposure on site, e.g. with a passport photograph, by the user, e.g. the end manufacturer of identity cards. The latter only has to ensure that mask exposure is performed, then the upper carrier film is removed and finally a protective layer is laminated or simply placed on top. The transparent multi-layer body personalized in this manner then only has to be inserted in a press, e.g. a Bürkle press, together with a substrate such as a document body or an additional film package containing or showing additional data, and to be hot-pressed to form a perfect bonding containing the individual data in its interior, which data are relatively well visible but cannot be willfully or counterfeitedly altered and manipulated, respectively.

The use of stamping hologram layers into which "diffractive zero order" grids are stamped is preferred. This type of grid, known as "DID", does not show the rainbow effect typical for surface hologram grids, but a defined color reconstruction of zero order. If the viewing angle is rotated by 90°, a defined change in color can be observed, similar to the one of the "Optical Variable Ink", "OVI", colors. "DID" grids have a deeper surface stamping structure than the rainbow holograms.

By application of a transparent adhesive layer on the printed layer, on which a high-refractive index coating has been vapor-plated, the color intensity of the DID grid reconstruction in the zero order is further increased so that according to the invention, applied diffractive areas in the form of individual information are obtained which are much better visible than transparent printed rainbow holograms, but which due to their transparency nevertheless allow a view of the document information below them. No additional safety efforts (except for light-proof packaging) are required for intermediate storage till application on the document takes place, since the multi-layer body according to the invention does not yet contain any individual data (information carrying personal data), but since these are only introduced during application.

It is an advantage if the multi-layer body e.g. has the dimensions of a DIN A3 sheet, e.g. with 24 to 36 "panels" with one UV adhesive layer area each, with even grid partitions, where for 24 areas or panels there is preferably a 4×6 arrangement. This leads to plate-shaped multi-layer body "intermediate products" in a handy format which can be brought from the manufacturer to the user in a very protective manner and in a form which is not yet personalized. The user can then e.g. provide several identity cards at the same time, by using these multi-layer bodies, without any substantial problems with alignment markers.

The method of manufacturing the multi-layer body according to the invention is also very advantageous since merely an adhesive layer to be activated by UV-light has to be applied, preferably printed, on a transparent polycarbonate film, in the form of at least one adhesive layer panel; after which a transparent print hologram film composite without adhesive coating, consisting of a carrier film, a release layer and a decorative layer, is laminated onto the PC film with adhesive layer. This is followed by a mask exposure of the at least one UV adhesive layer panel, which partially activates the adhesive, and thus cured and uncured UV adhesive areas being present, where the cured UV adhesive portions perfectly bond the lower polycarbonate film and parts of the decorative layer together. A very effective particularity consists in the fact that mask exposure takes place such that the cured UV adhesive portion is arranged at the periphery of the uncured UV adhesive portion of the respective at least one adhesive layer panel, surrounding it in the form of a frame.

This ensures secure fixation of the individual layers of the multi-layer body prepared in this manner, allowing easy and safe transport to the final processing site or the application site, respectively. The great advantage, according to the invention, of subsequent personalization (holographic introduction of a passport photograph) during final processing to form the desired forgery-proof document still exists.

The manufacture of forgery-proof documents using a multi-layer body according to the invention described above is, as has partly been described above, relatively easy and safe. It mainly consists in subsequent partial light-curing, on the user's site, of the uncured adhesive layer portion of the at least one adhesive area panel in/on the multi-layer body through an optical mask carrying information, e.g. a passport photograph, leading to subsequent personalization. After that, the polyethylene (PET) carrier film, which is provided with a release layer, is removed together with the non-adhesive print hologram layer portions of the transparent print hologram film composite; and then a top protective film is applied on the personalized print hologram layer. This film (sandwich) composite or film package is then hot-pressed, e.g. in a Bürkle press, together with other films placed under it or an additional film composite, substrate or document.

Then the hot-pressed composite is punched into a card format, e.g. in the manufacture of identity cards.

This means that it is no longer necessary, as in conventional manufacture, e.g. after exposure to light, to first remove a lower paper sheet, then adhesively bond it to a substrate and subsequently remove the top carrier layer, apply a top protective layer and finally perform pressing and cutting. According to the invention, the user only has to remove the top carrier layer, apply the protective layer, place additional layers under it and press the entire composite and cut it into card shape.

Naturally, there is also the possibility of performing, after removing the carrier film with the non-adhesive decorative film portions, surface cleaning by rolling over an adhering film, removing non-adhesive film residues.

As a matter of course, it is also advantageous to perform complete UV curing after application of the protective layer.

According to the invention, it is now possible, as has been mentioned above, to provide multi-layer bodies for manufacturing individual identity cards or bodies for manufacturing a plurality of cards.

Thus, for the manufacture of identity cards, a multi-layer body with dimensions of e.g. a DIN A3 sheet with 24 "panels" and a preferable arrangement of 4×6 panels can be used, where four panels each are simultaneously subjected to UV mask exposure, totaling six steps. After final pressing, 24 cards can be punched out of the sheet.

In the following, the invention will be described using examples of embodiment with reference to the drawings, wherein FIG. 1 shows a vertical section through a multi-layer body according to the invention, FIG. 2 shows the multi-layer body from FIG. 1 during personalizing UV mask exposure, FIG. 3 shows the multi-layer body from FIG. 2 with the carrier film removed, FIGS. 4 through 6 schematically show three successive steps for manufacturing the multi-layer film from FIG. 1, FIGS. 7 through 11 schematically show the successive steps for manufacturing a forgery-proof document using the multi-layer body from FIG. 1, and FIGS. 12 and 13 show a document with passport photograph hologram in top view and in sectional view.

As can be seen in FIG. 1, a multi-layer body 1 according to the invention substantially consists of a polycarbonate (PC) film 2 and a print hologram film composite 3 (in short: hot stamping film), between which at least one UV adhesive layer zone 4 is arranged having an exterior UV-cured adhesive layer area 5 (exterior area) and an interior non-UV-cured adhesive layer area 6 enclosed by the former as by a frame.

The hot stamping film 3 is composed of an upper polyethylene (PET) carrier film 7 provided with a release layer 8 and a stamp hologram layer 9 which is vapor-plated at the bottom with a high-refractive index dielectric reflecting layer 10; together these are termed a "decorative layer".

The stamp hologram layer 9 has (arranged vertically in this case) an adhesively bonded stamp hologram portion 12 on top of the UV-cured adhesive layer portions 5, whereas non-bonded adhesive portions 11 can be seen on top of the non-UV-cured adhesive portions 6 and the zones free from adhesive. By adhesion, the portion 12 of the stamp hologram layer 9 is perfectly bonded to the top of the respective cured adhesive layer area 5 and with this with the polycarbonate film 2.

At this stage, the completely transparent multi-layer body 1 is intermediately stored till application on a substrate or a document. It contains only optical stamp hologram elements without any information carrying personal data, in particular without a passport photograph.

FIG. 2 shows how in the course of application (transfer), with use of an information-bearing optical mask 13, the multi-layer body 1 is exposed to UV light vertically from above the non-cured adhesive layer portion 6, this portion being partially cured in this manner. Thus, additional UV-cured portions 5 were created which also established a perfect bond of the stamp hologram layer portions 12 above them with the polycarbonate film 2.

FIG. 3 shows the transfer step of removing the carrier film 7, provided with the release layer 8, from the composite film 3, together with non-bonded stamp hologram layer portions 11.

FIG. 4 illustrates how several adhesive layer zones 4 are arranged or printed on a polycarbonate film 2 in an even arrangement behind each other and next to each other (not shown).

Figure 5:
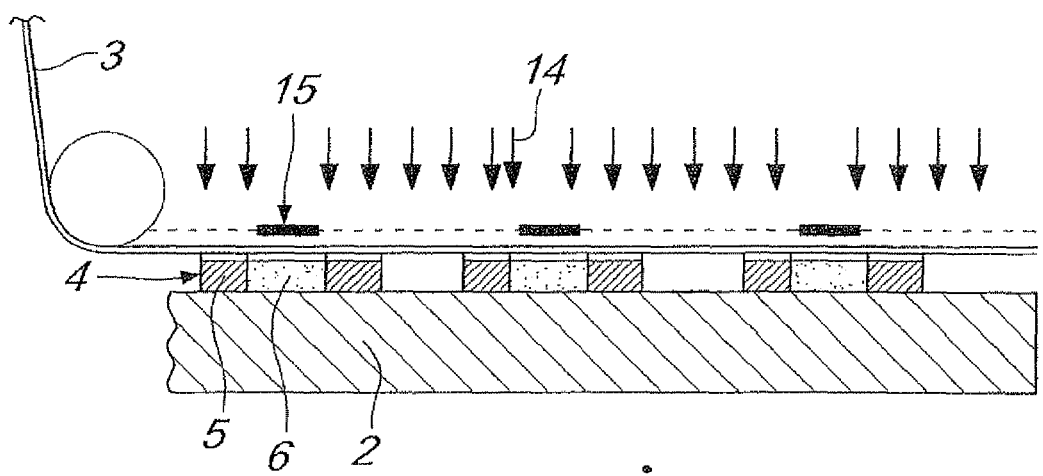

FIG. 5 shows how a stamp hologram film composite 3 is laminated onto the adhesive zones 4, with exposure to UV light 14 taking place simultaneously or shortly after by means of an optical mask 15 such that the adhesive layer zones 4 are then partially cured, with one UV-cured exterior zone 5 and one non-UV-cured interior zone 6 each.

Figure 1:
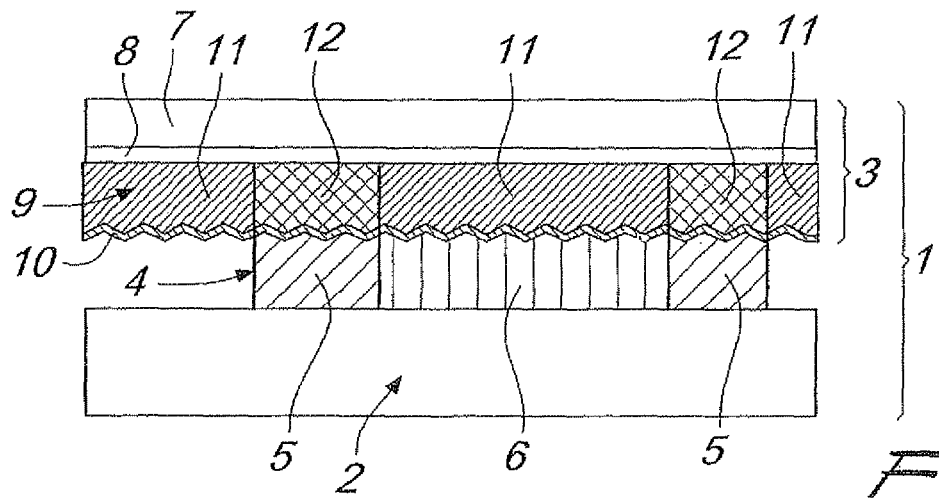
Figure 6:
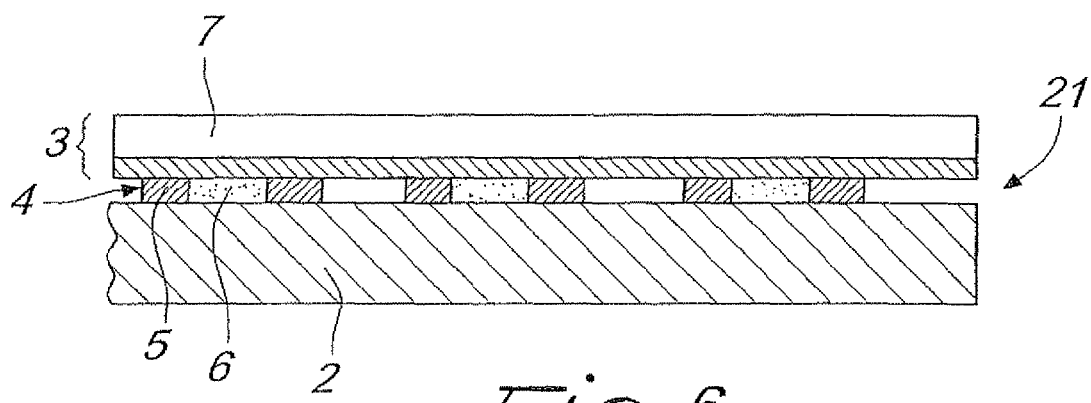

FIG. 6 shows how in a further step, the (poly-)multi-layer body sheet is completed, which sheet is substantially structured in the same way as the multi-layer body 1 from FIG. 1, in an even multi-zone arrangement next to and behind each other. In this state, however protected from UV light, the (poly-)multi-layer body sheet 21 is transferred to the recipients for further processing.

FIGS. 7 through 11 illustrate the main individual steps for the manufacture of personal documents (identity cards) by means of a (poly-)multi-layer body sheet 21, performed by the recipient/user/manufacturer of personal documents (identity cards).

Figure 2:
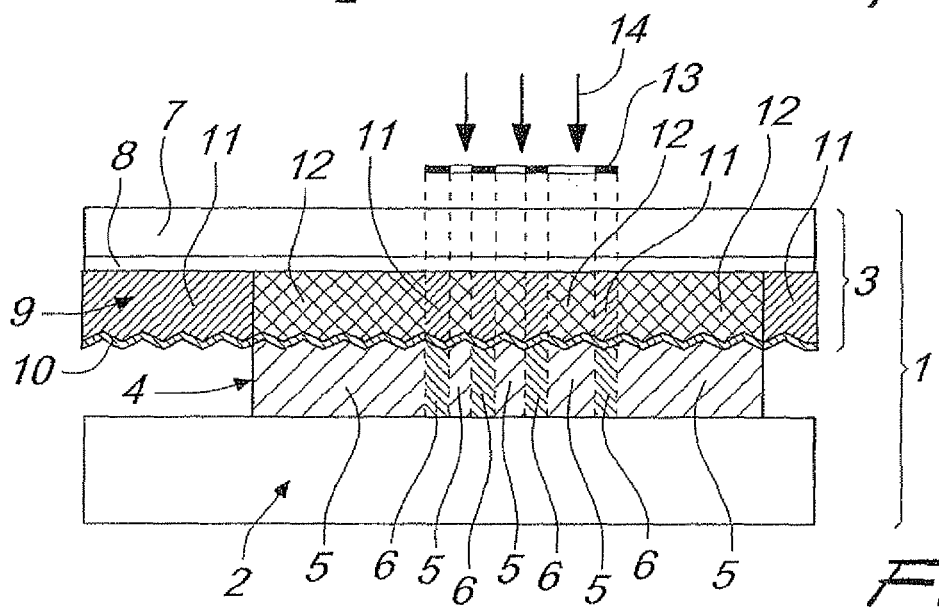
Figure 7:
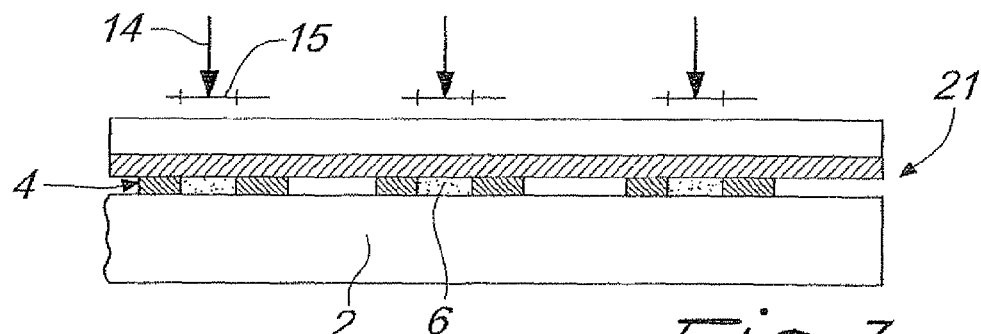

FIG. 7 shows how the non-UV-cured adhesive layer zones 6 of the several adhesive layer zones 4 of a (poly-)multi-layer body 21 (from FIG. 6) are now partially cured by UV exposure 14 through an information-bearing optical mask 15, as is described in more detail in connection with FIG. 2.

Figure 3:
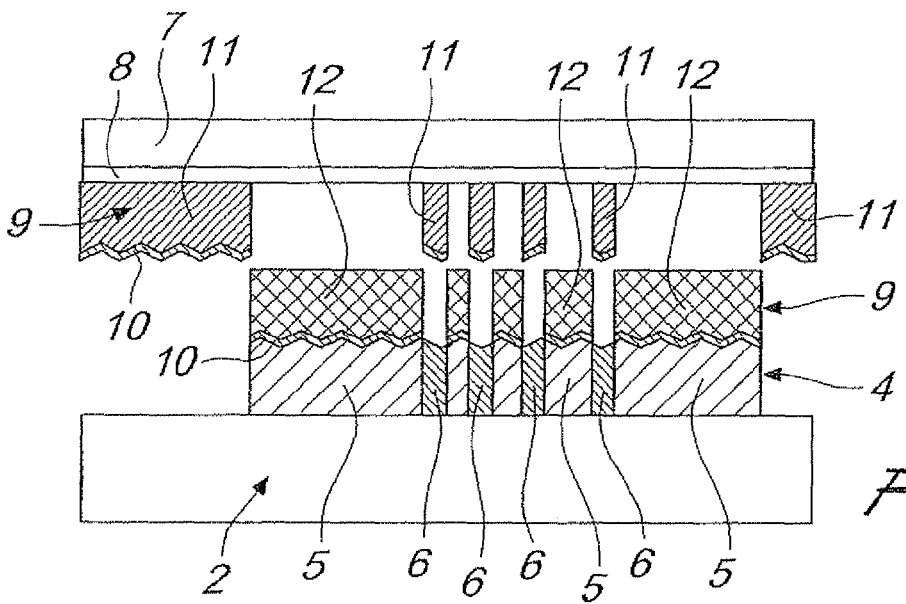
Figure 4:
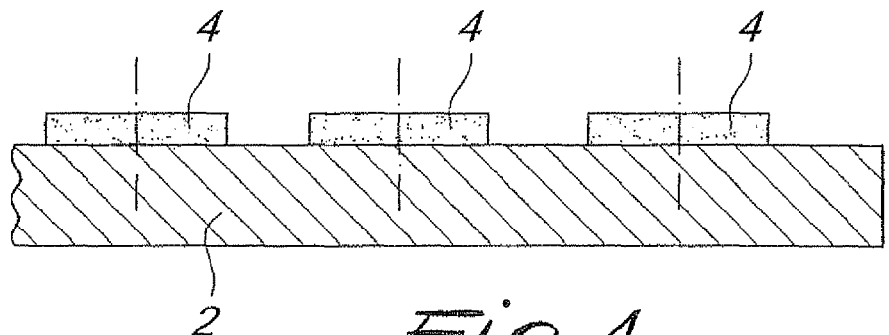
FIGS. 4, 5 and 6 show the main manufacture steps for a (poly-) multi-layer body sheet 21 according to the invention, that is, as a band or sheet with several panels, i.e. active zones, in plane arrangement next to and behind one another, which are subsequently used for manufacturing approximately as many security documents.
Figure 8:
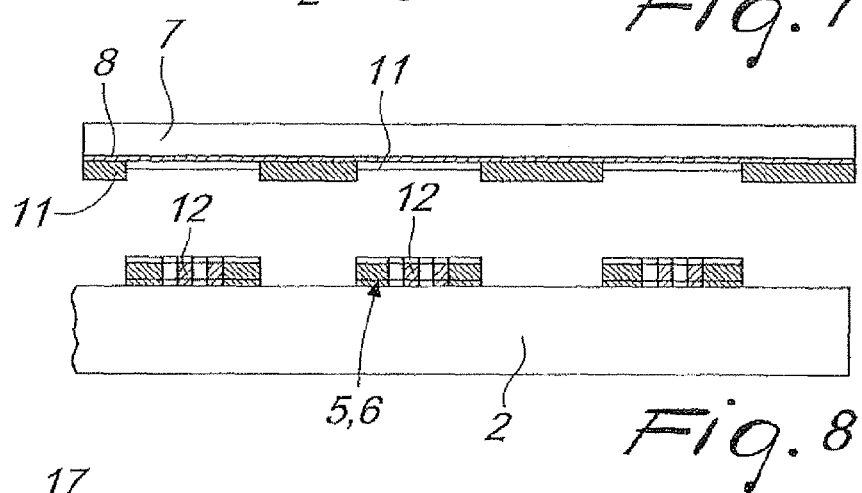

FIG. 8 shows how, similar to the simpler process described in connection with FIG. 3, the carrier film 7 is removed, non-bonded stamp hologram layer zones 11 being removed together with the release layer 8.

Figure 9:
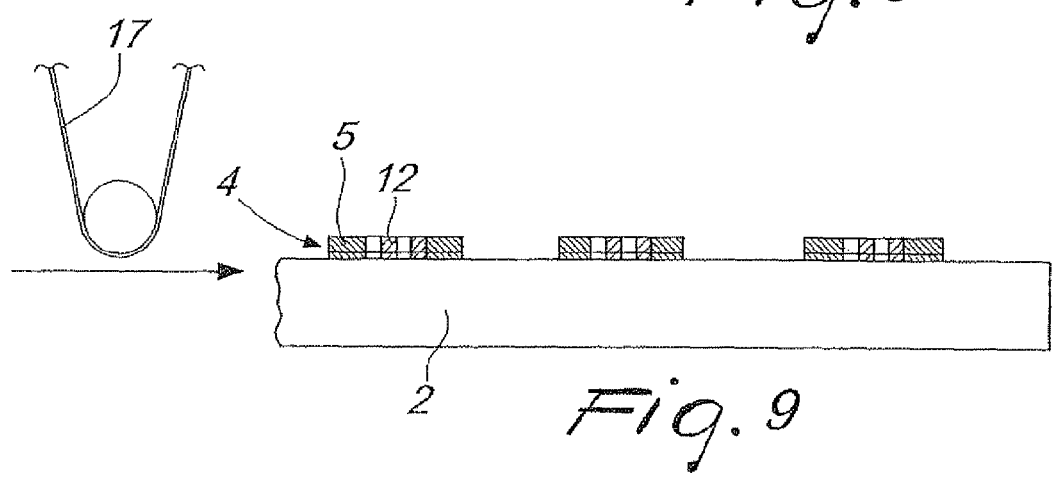

FIG. 9 illustrates how, after this, an adhering film 17 is rolled over the personalized stamp hologram layer zones 12 which were adhesively bonded and remain on the polycarbonate film, the non-bonded film residues remaining on it being removed in this manner.

Figure 10:
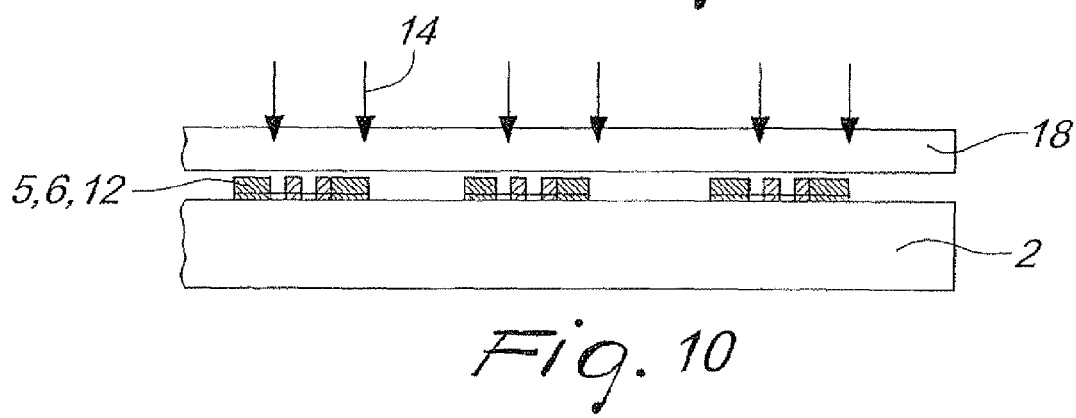

FIG. 10 illustrates how subsequently an additional polycarbonate film is laminated and completely UV-cured.

Alternatively, an additional polycarbonate film (protective film) can simply be placed on the personalized decorative layer and this composite film can be hot-pressed, together with other films placed under it. This can be done as shown in FIG. 11, by means of a very schematically shown press 20, e.g. a Bürkle press.

Figure 11:
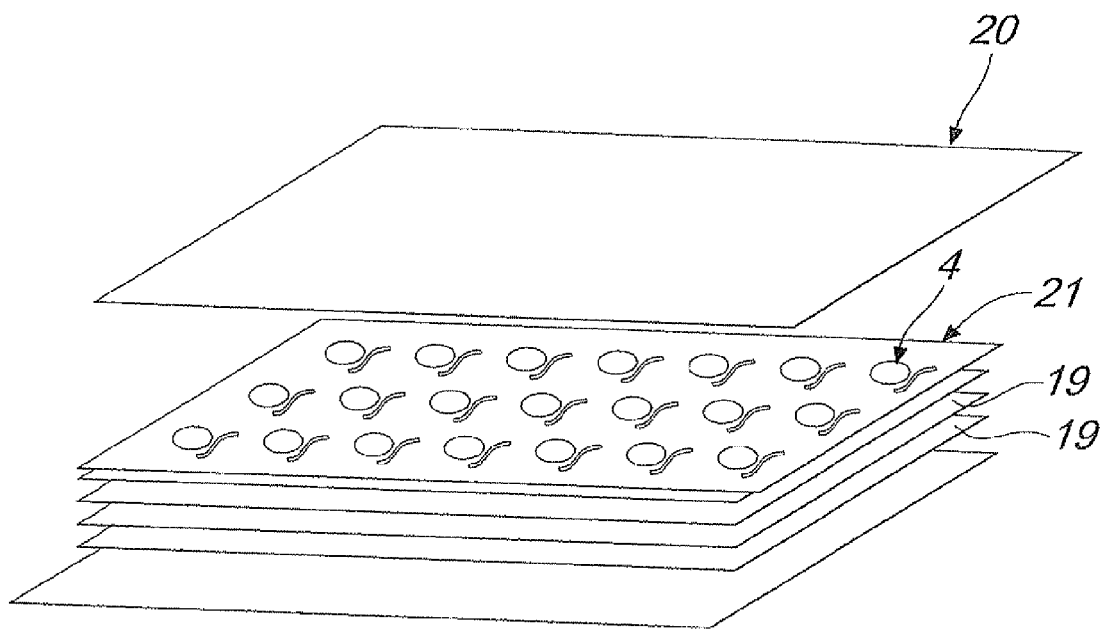
Figure 12:
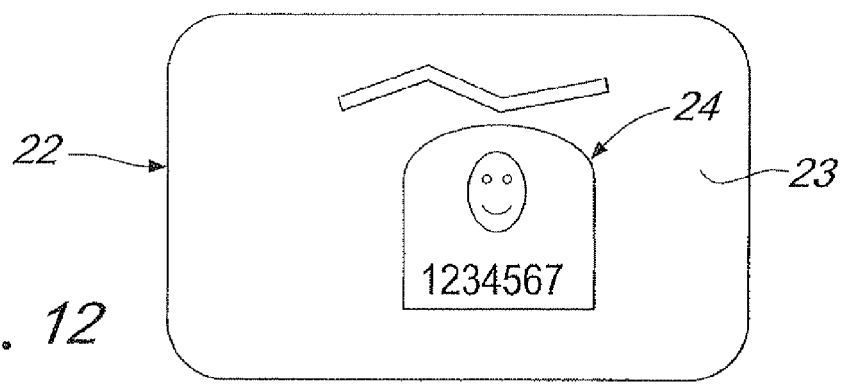
Figure 13:
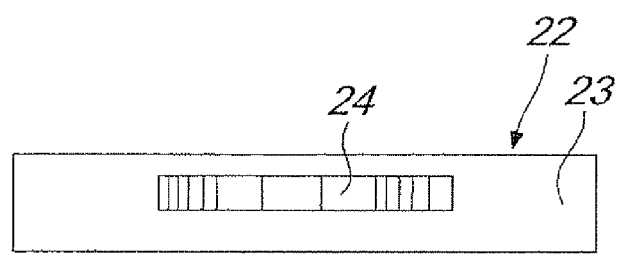

Finally, FIGS. 12 and 13 show a personal identity card 22 that was punched out of a hot-pressed composite film according to FIG. 11 in the usual format.

FIG. 12 shows the card 22 having a card body 23 whose interior contains the personalized decorative layer 24 with the passport photograph, fused in and unalterable.

This arrangement is also well visible in FIG. 13 which shows a section through the card 22.

LIST OF REFERENCE NUMBERS 1. multi-layer body
2. polycarbonate (PC) film
3. stamp hologram composite film (hot stamping film)
4. adhesive layer zone or panel or active zone
5. UV-cured adhesive layer zone (exterior zone)
6. non-UV-cured adhesive layer zone
7. polyethylene (PET) film
8. release layer
9. stamp hologram layer
10. reflecting layer
11. non-bonded stamp hologram zone
12. adhesively bonded stamp hologram zone
13. mask
14. UV light
15. mask
16. - - -
17. adhering film
18. (PC) protecting film
19. film
20. (Bürkle) press
21. multi-layer body sheet
22. (personal) document card 23. card body
24. personalized decorative layer zone

The invention claimed is:

1. A multi-layer body for forgery-proof documents with a hologram, comprising:
   a transparent stamp hologram film composite including a carrier film, a release layer and a decorative layer, the decorative layer including a stamp hologram layer and a high-refractive index reflecting layer vapor-plated on the bottom of the stamp hologram layer;
   an adhesive layer including at least one partially ultraviolet (UV) activated zone, the at least one partially UV activated zone including UV cured adhesive areas and a non-UV cured adhesive area, the UV cured adhesive areas arranged about the periphery of the non-UV cured adhesive area so as to form a frame surrounding the non-UV cured adhesive area; and
   a bottom layer of transparent polycarbonate film, the UV cured adhesive areas bonding the bottom layer and portions of the decorative layer to each other,
   the multi-layer body having dimensions of approximately 297 mm by 420 mm, and the adhesive layer including between 24 and 36 partially UV activated zones, and the partially UV activated zones being evenly distributed across the adhesive layer.

2. The multi-layer body of claim 1, wherein the transparent polycarbonate film has a thickness of 50-100 μm.

3. The multi-layer body of claim 1, wherein the stamp hologram layer includes diffractive zero order grids which are printed into the stamp hologram layer.

4. A method for manufacturing a multi-layer body, comprising:
   printing an adhesive layer onto a polycarbonate film, the adhesive layer including at least one zone, the at least one zone being partially ultraviolet (UV) activated;
   laminating a transparent print hologram film composite onto the adhesive layer of the polycarbonate film, the transparent print hologram film composite including a carrier film, a release layer and a decorative layer, and the transparent print hologram film composite lacking an adhesive coating;
   exposing, via a mask, the at least one zone to UV light, such that, the at least one zone is partially activated to include UV cured adhesive areas and a non-UV cured adhesive area, thereby bonding a bottom portion of the transparent polycarbonate film and portions of the decorative layer to each other, wherein the UV cured adhesive areas are arranged about the periphery of the non-UV cured adhesive area so as to form a frame surrounding the non-UV cured adhesive area.

5. The method of claim 4, wherein the multi-layer body is a transparent multi-layer body, and is intermediately stored until the multi-layer body is applied to a substrate or document.

6. A method for manufacturing a forgery-proof documents using a multi-layer body, the multi-layer body comprising:
   a transparent stamp hologram film composite including a carrier film, a release layer and a decorative layer, the decorative layer including a stamp hologram layer and a high-refractive index reflecting layer vapor-plated on the bottom of the stamp hologram layer;
   an adhesive layer including at least one partially ultraviolet (UV) activated zone, the at least one partially UV activated zone including UV cured adhesive areas and a non-UV cured adhesive area, the UV cured adhesive areas arranged about the periphery of the non-UV cured adhesive area so as to form a frame surrounding the non-UV cured adhesive area; and
   a bottom layer of transparent polycarbonate film, the UV cured adhesive areas bonding the bottom layer and portions of the decorative layer to each other, the method comprising:
   partially curing the non-UV cured adhesive area of the multi-layer body through an information-bearing UV light optical mask, to generate in non-bonded zones of the stamp hologram layer and personalization of the stamp hologram layer;
   removing, via the release layer, the carrier film and the non-bonded zones of the stamp hologram layer;
   applying an upper protective film to the personalized stamp hologram layer to generate a composite multi-layer body; and
   hot pressing the composite multi-layer body with at least one of an additional film composite, a substrate or a document.

7. The method of claim 6, further comprising punching out the resultant hot pressed composite into card format.

8. The method of claim 6, wherein subsequent to the removal of the carrier film, an adhering film is rolled over surfaces of the UV cured areas to remove film residues of the non-bonded zones of the stamp hologram layer.

9. The method of claim 6, further comprising complete UV curing subsequent to the application of the upper protecting film.

10. The method of claim 6, wherein the multi-layer body has dimensions of approximately 297 mm by 420 mm, and the method further comprises punching out the resultant hot pressed composite into 24 identification cards.

* * * * *